(12) United States Patent
Cepuran

(10) Patent No.: US 11,716,594 B2
(45) Date of Patent: *Aug. 1, 2023

(54) COMMON PLATFORM FOR PERSONALIZED/BRANDED APPLICATIONS

(71) Applicant: D2L Corporation, Kitchener (CA)

(72) Inventor: Brian Cepuran, Kitchener (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/127,490

(22) Filed: Dec. 18, 2020

(65) Prior Publication Data

US 2021/0105581 A1  Apr. 8, 2021

Related U.S. Application Data

(63) Continuation of application No. 14/030,409, filed on Sep. 18, 2013, now Pat. No. 10,904,700.

(51) Int. Cl.
*H04W 4/029* (2018.01)

(52) U.S. Cl.
CPC .................................. *H04W 4/029* (2018.02)

(58) Field of Classification Search
CPC ....... H04W 4/029; H04W 4/02; H04W 64/00; H04L 29/08657
USPC ... 455/456.3, 456.1, 414.1, 566, 418, 432.1, 455/422.1
See application file for complete search history.

(56) References Cited

U.S. PATENT DOCUMENTS

| | | | | |
|---|---|---|---|---|
| 7,383,037 | B2 * | 6/2008 | Grossman | G07F 17/323 455/414.3 |
| 8,375,408 | B2 * | 2/2013 | Bachet | H04N 21/8543 725/40 |
| 10,904,700 | B2 * | 1/2021 | Cepuran | H04W 4/029 |
| 2004/0260464 | A1 * | 12/2004 | Wong | G01C 21/3611 701/533 |
| 2010/0034425 | A1 * | 2/2010 | Lin | G06T 7/20 382/103 |
| 2010/0285781 | A1 * | 11/2010 | Dai | H04M 3/493 455/414.1 |
| 2011/0300946 | A1 * | 12/2011 | Stafford | A63F 13/352 463/42 |
| 2012/0084652 | A1 * | 4/2012 | Martinez Bauza | H04N 13/128 348/E13.001 |
| 2012/0136815 | A1 * | 5/2012 | Ozawa | G06F 16/337 706/12 |
| 2012/0299960 | A1 * | 11/2012 | Soderstrom | G06T 7/246 345/629 |
| 2014/0289047 | A1 * | 9/2014 | Yee | G06Q 30/0261 705/14.58 |

* cited by examiner

*Primary Examiner* — Nghi H Ly
(74) *Attorney, Agent, or Firm* — Amarok IP Inc.; Neil W. Henderson

(57) ABSTRACT

The disclosure is directed at a method of personalizing an application for displaying, on a mobile communication device, user content associated with a site, the method comprising determining location of the mobile communication device, calculating travel characteristics of the mobile communication device, determining presence of a site, obtaining user preferences for display of user content, and retrieving and displaying user content associated with the site on the mobile communication device.

20 Claims, 6 Drawing Sheets

COMMON PLATFORM FOR PERSONALIZED/BRANDED APPLICATIONS

RELATED APPLICATION

The present disclosure is a divisional of U.S. patent application Ser. No. 14/030,409, filed on Sep. 18, 2013, which is hereby incorporated in its entirety herein.

FIELD

The present disclosure relates generally to personalizing applications. More particularly, the present disclosure relates to systems and methods for providing a common platform for personalized/branded applications.

BACKGROUND

In the digital technology age, users are regularly relying on their mobile communication devices to access information. Mobile communication devices typically have applications stored within to retrieve such information. The introduction of these applications has led to the use of mobile communication devices in previously unconsidered ways.

One of these uses is as a device for gathering or receiving information. Applications executing on these devices may allow a user to retrieve or view information or user content based on their geographical location whereby the information can be retrieved and viewed on-the-fly. The opportunity to obtain certain information on demand by the user has been improved by the use of these applications.

In many current solutions, the information being retrieved is associated with an individual application stored in the mobile communication device. Therefore, for individuals wishing to retrieve information from multiple sources, multiple applications are required.

Therefore, there is provided a novel method and system for providing a common platform for personalized/branded applications.

The above information is presented as background information only to assist with an understanding of the present disclosure. No determination has been made, and no assertion is made, as to whether any of the above might be applicable as prior art with regard to the present disclosure.

SUMMARY

It is an object of the present disclosure to obviate or mitigate at least one disadvantage of previous methods and systems for displaying information to users on a mobile communication device.

In one aspect, there is provided a method of personalizing an application for displaying, on a mobile communication device, user content associated with a site, the method including determining location of the mobile communication device; calculating travel characteristics of the mobile communication device; determining presence of a site; obtaining user preferences for display of user content; and retrieving and displaying user content associated with the site on the mobile communication device.

In another aspect, determining location of the mobile communication device includes accessing location software on the mobile communication device.

In another aspect, the location software is global positioning system (GPS).

In a further aspect, calculating travel characteristics includes at least one of determining direction of travel of the mobile communication device or determining speed of travel of the mobile communication device.

Another aspect of the disclosure is that determining presence of a site includes determining list of sites proximate the location of the mobile communication device; and creating a list of sites of interest from the list of sites based on travel characteristics of the mobile communication device.

In yet a further aspect, displaying the list of sites of interest for selection by a user; and receiving user's selection of site.

In another aspect, choosing a site from the list of sites of interest is based on user criteria.

A further aspect includes obtaining user preferences for display of user content by accessing a database storing displaying requirements associated with a user of the mobile communication device.

In yet a further aspect, the method or personalizing is performed within a learning management system.

In another aspect, there is provided a computer program product including a computer readable memory storing computer executable instructions thereon that when executed by a computer to perform steps of determining location of the mobile communication device; calculating travel characteristics of the mobile communication device; determining presence of a site; obtaining user preferences for display of user content; and retrieving and displaying user content associated with the site on the mobile communication device.

In yet another aspect, there is provided a method of displaying, within a customized application, user content for a site of interest to a user associated with a mobile communication device including determining location of the mobile communication device; creating list of sites of interest in proximity to the mobile communication device; obtaining travel characteristics of the mobile communication device; selecting a site of interest from the list of sites of interest based on travel characteristics and location of the mobile communication device; checking user defined preferences for display of user content for the customized application; and displaying customized application within user content associated with selected site of interest.

In yet another aspect, determining location of the mobile communication device includes accessing location software on the mobile communication device.

In a further aspect of the disclosure, the location software is a global positioning system (GPS).

A further aspect of the disclosure includes creating list of sites of interest by comparing location of mobile communication device with sites of interest stored in a database; and selecting sites of interest in the database which are within a specified distance from the location of the mobile communication device to create a list of sites of interest.

In another aspect, comparing location includes comparing location of mobile communication device with location data corresponding to the list of places of interest.

In a further aspect, obtaining travel characteristics includes retrieving direction of travel of the mobile communication device and speed of travel of the mobile communication device.

Other aspects and features of the present disclosure will become apparent to those ordinarily skilled in the art upon review of the following description of specific embodiments in conjunction with the accompanying Figures.

BRIEF DESCRIPTION OF FIGURES

Embodiments of the present disclosure will now be described, by way of example only, with reference to the attached Figures

Throughout the drawings, it should be noted that like reference numbers are used to depict the same or similar elements, features, and structures.

DETAILED DESCRIPTION

The following description with reference to the accompanying drawings is provided to assist in a comprehensive understanding of exemplary embodiments of the disclosure as defined by the claims and their equivalents. The following description includes various specific details to assist in that understanding but these are to be regarded as merely exemplary. Accordingly, those of ordinary skill in the art will recognize that various changes and modifications of the embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of exemplary embodiments of the present disclosure is provided for illustration purpose only and not for the purpose of limiting the disclosure as defined by the appended claims and their equivalents.

Generally, the present disclosure provides a method and system for providing a common platform for personalized/branded applications. In an embodiment, the disclosure is for use with a mobile communication device.

In one embodiment, the system comprises a mobile communication device which is in communication with various external servers for receiving information from these servers. The external servers are associated with entities, such as, but not limited to, academic institutions, restaurants or points of interest. In operation, there is an assumption of a desire for obtaining information by the user from these different entities. The mobile communication device has means or modules stored within for assisting with obtaining the information.

In the current system, as the user is travelling past different entities, the location and the travel characteristics of the mobile communication device are determined in order to have information transmitted or pushed to the device or to assist in the retrieval of information by the mobile communication device. For instance, in one example, based on the geographical location of the mobile communication device and the speed at which the mobile communication device is travelling, the mobile communication device may transmit a message to a server to obtain information about an entity.

Figure 1:
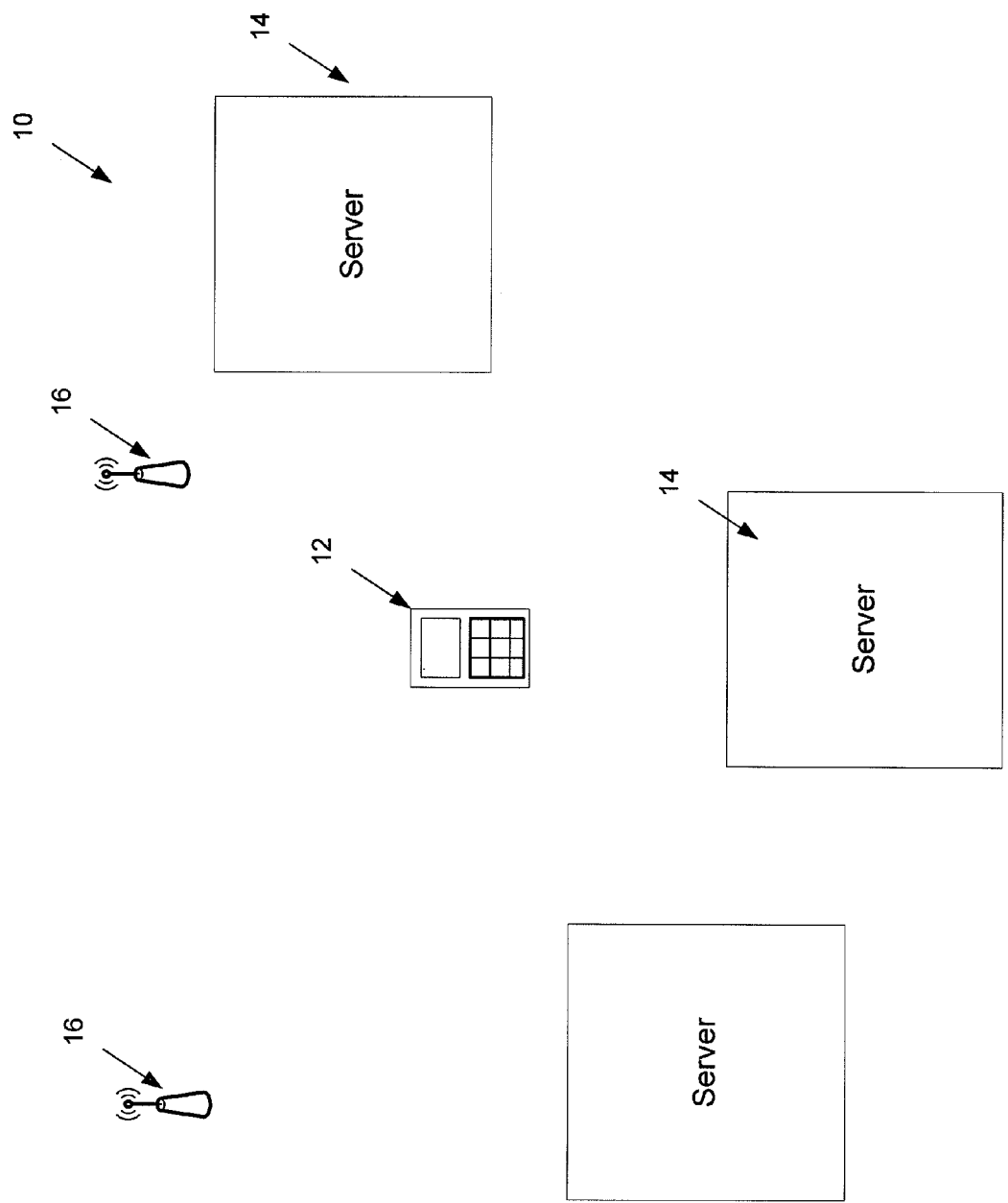
FIG. 1 is schematic diagram of a system for mobile communication device communication according to an exemplary embodiment of the present disclosure.

Turning to FIG. 1, a system for communicating with a mobile communication device is shown according to an exemplary embodiment of the present disclosure. The system 10 includes a mobile communication device 12 which is associated with a user. Information may be transmitted and received between the mobile communication device 12 and multiple servers 14 which are associated with entities or sites from which the user may wish to receive or retrieve information. The mobile communication device 12 may also be in communication with location determination apparatus 16 such as, but not limited to, Global Positioning Service (GPS) apparatus. Other location determination apparatus are also contemplated. The location determination apparatus assists to determine the location of the mobile communication device 12.

Figure 2:
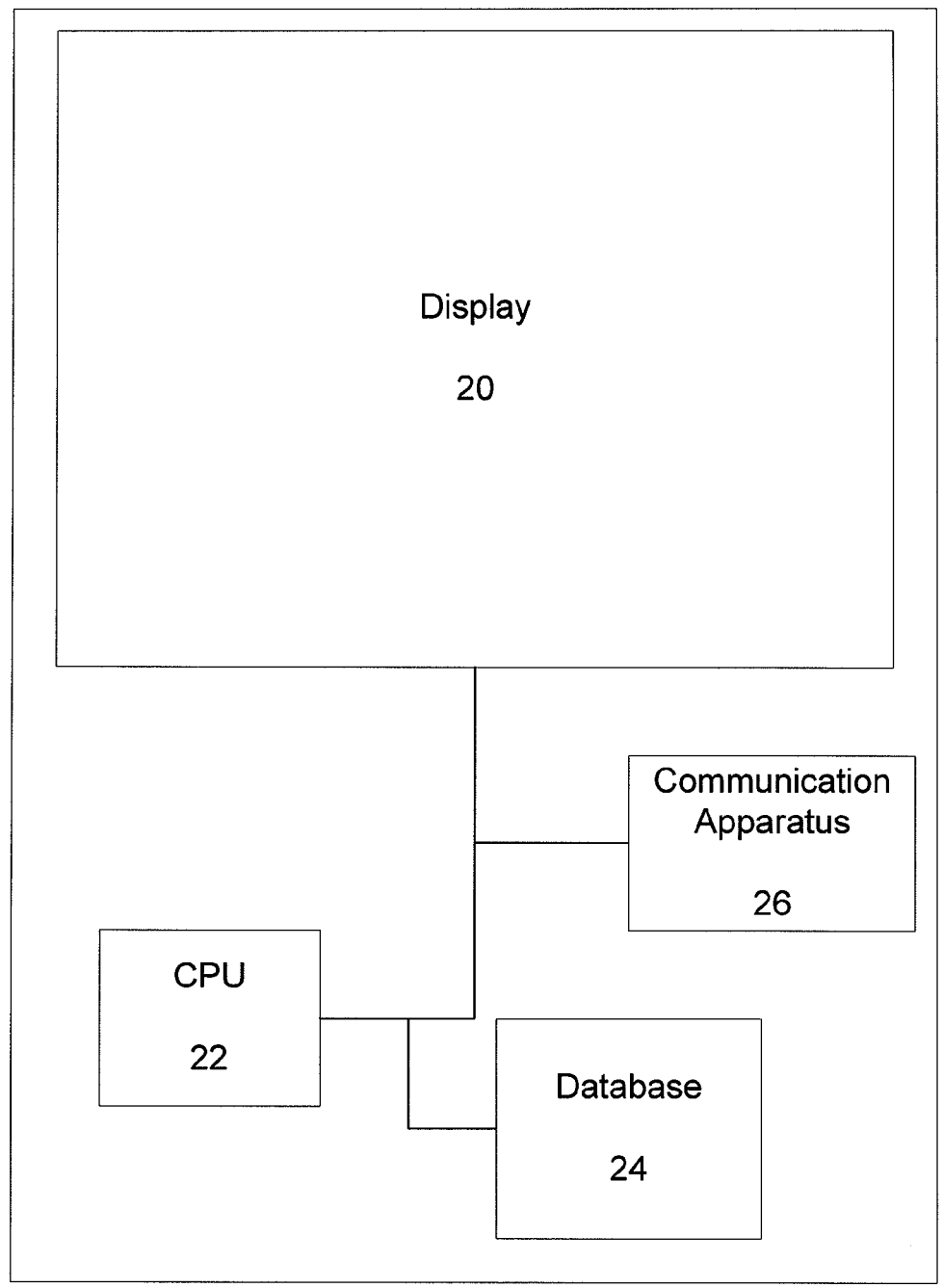
FIG. 2 is a schematic diagram of a mobile communication device according to an exemplary embodiment of the present disclosure.

Turning to FIG. 2, a schematic diagram of a mobile communication device is shown according to an exemplary embodiment of the present disclosure. As shown, the mobile communication device 12 comprises a display 20, a processor 22, a database 24 and communication apparatus 26. In one embodiment, the communication apparatus 26 includes an antenna for transmitting information to and receiving information from the servers 14. The handling of the communication between the mobile communication device 12 and a server 14 will be understood by one skilled in the art.

Figure 3:
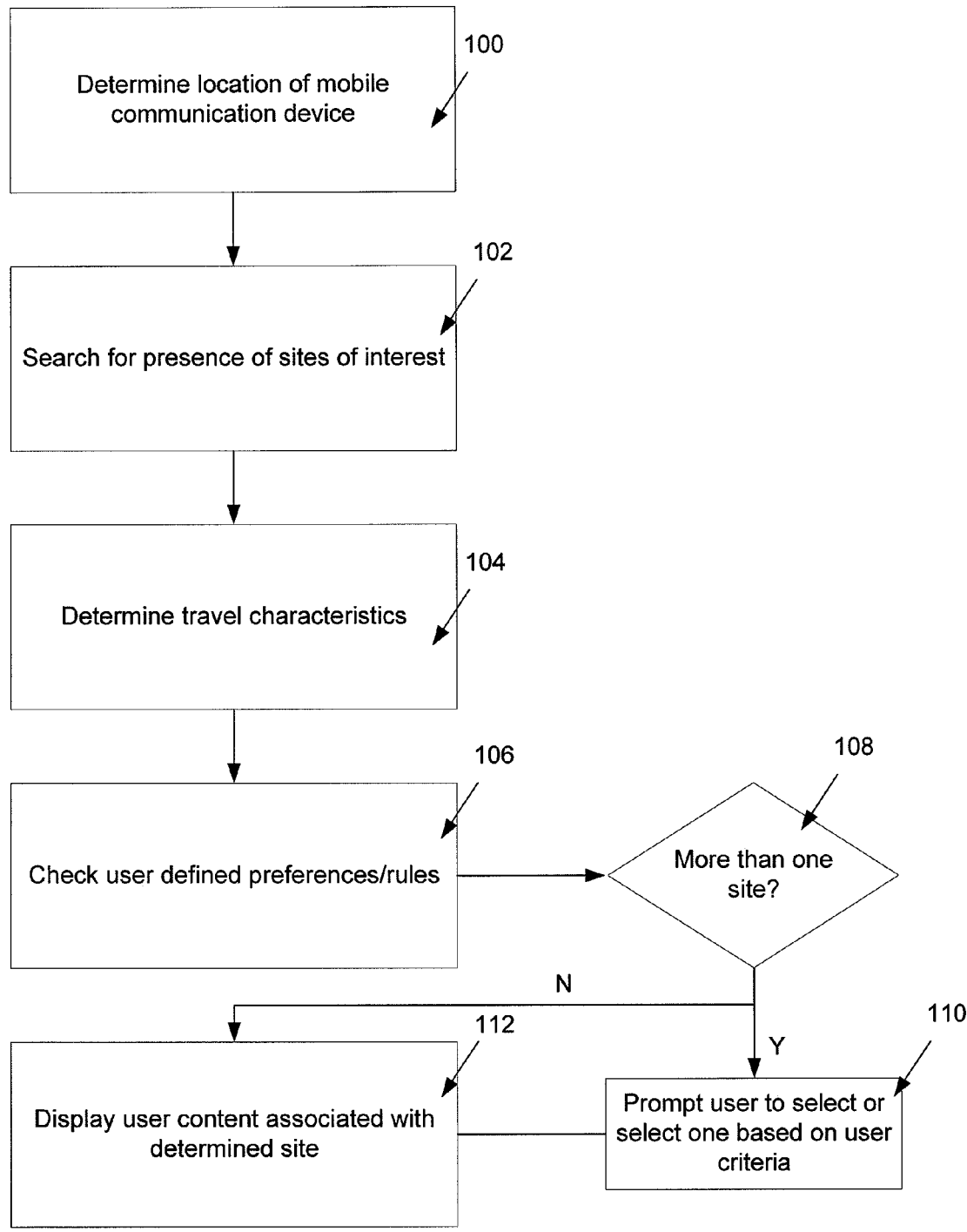
FIG. 3 is a flowchart outlining a method of providing a common platform for personalized/branded applications according to an exemplary embodiment of the present disclosure.

Turning to FIG. 3, a flowchart outlining a method of providing a common platform for personalized/branded applications is shown according to an exemplary embodiment of the present disclosure. It is assumed that the mobile communication device has computer readable medium pre-stored which assist in implementing the method of providing a common platform for personalized/branded applications.

In operation, the location of the mobile communication device is determined 100. In one embodiment, the location of the mobile communication device may be determined via known methods such as, but not limited to, Global Positioning System (GPS) technology or cellular geolocation. The location of the mobile communication device may also be determined by having a user enter address information associated with their location. This address information may include, but is not limited to, a postal code, a zip code, a point of interest, an academic institution, a city name, or an intersection of two streets.

After the location of the mobile communication device is determined, a search is performed to see if there are any sites of interest nearby 102. A site of interest may be defined as a location or an entity having user content that can be delivered to the mobile communication device for review by the user or user content which may be requested by the user. For instance, if a user is walking past a mall, a site of interest could be any store or restaurant within the mall or the mall itself. In another example, the user may be driving in a city where an academic institution may be a site of interest. In a further example, the user may be walking around an academic institution and departments or buildings within the academic institution may be a site of interest. The sites of interested may be previously stored in the database or servers associated with the sites of interested may communication this to the processor of the mobile communication device.

After the sites of interest are determined, the travel characteristics of the mobile communication device are determined 104. As understood, the mobile communication device itself does not do any travelling by itself but is associated with the travel patterns of its owner or user. For instance, the user may be driving in a car, riding on a bus or walking on the street. The travel characteristics may include, but are not limited to, speed of travel and direction of travel. The determination of the travel characteristics provide an indication as to which sites may be of interest. For example, if a user is riding a bus past a mall, the sites of interest within the mall may be ruled out as sites of interest due to speed of travel past the mall, however, sites which are farther down the road, in the direction of travel, may be of more interest.

In order to determine travel characteristics, the processor within the mobile communication device may continuously retrieve positioning information and compare the most recent retrieve position with the last known position in order to determine direction or travel. Speed may be determined by calculating the distance travelled with respect to time elapsed since the last position was retrieved.

After the travel characteristics are determined, the user defined preferences or rules for display of user content or information are retrieved 106. These user defined preferences or rules are preferably stored in a database within the mobile communication device. These preferences may be directed at the nature of the display of user content or information on the mobile communication device to the user. For instance, if the site of interest is an academic institution, the user may wish to only see information relating to scholarships available to students. Alternatively, the user may only wish to see the food options available at the academic institution. In another example, if the sites of interest are restaurants, the user may only want to see the drink menu rather than a full menu and therefore, the information which is displayed to the user may be restricted to drinks.

A check is then performed to determine if there is more than one site of interest in the proximity of the mobile communication device 108 or which fall within the location and travel characteristics of the mobile communication device. If there is more than one site of interest, the user is provided with a prompt to select one of the sites of interest 110. In one example, the list of sites of interest are listed on the display and the user can select the one which they wish to view user content from. Alternatively, the processor may determine the site of interested associated with the user content the user wishes to view based on previously stored user criteria. After the site of interest has been determined, the user content is retrieved and displayed to the user 112.

If there is only one site of interest in the determination of 108, the user content for this site of interest is immediately retrieved and displayed to the user 112.

While the methods have been disclosed with individual steps, the order in which the steps are performed may be interchanged and not necessarily in the order as outlined in FIG. 1.

Figure 4:
FIG. 4 is an example of a mobile communication device displaying a branded application according to an exemplary embodiment of the present disclosure.

Turning to FIG. 4, an example of a mobile communication device displaying a branded application according to an exemplary embodiment of the present disclosure is shown. In the current Figure, it is assumed that the user is interested in obtaining information about academic institutions that are in proximity to the user's location. FIG. 4 shows a mobile communication device displaying a branded application such as would be displayed to a user in 112 of the flowchart of FIG. 3.

As shown in FIG. 4, the mobile communication device 12 includes a display 20 for displaying the branded application to the user. The information which is displayed to the user may include an indication or identification 30 of the academic institution (University of Waterloo) along with a picture 32 showing the campus. As will be understood, other information relating to an identification of the academic instruction may be displayed. Based on the user's preferences with respect to the branded application, information 34 relating to the academic institution is displayed. This is assuming that the user defined preferences/rules indicate that the user wishes to review background information on academic institutions when they are selected as a site of interest.

Figure 5:
FIG. 5 is another example of a mobile communication device displaying a branded application according to an exemplary embodiment of the present disclosure.

Turning to FIG. 5, another example of a mobile communication device displaying a branded application according to an exemplary embodiment of the present disclosure is shown. In this figure, it is assumed that the user defined preferences/rules with respect to the branded application require that information relating to the engineering programs with respect to the academic institution be displayed.

As shown in FIG. 5, the mobile communication device 12 includes a display 20 for displaying the branded application to the user. The information which is displayed to the user may include an indication or identification 30 of the academic institution (University of Waterloo) along with a picture 32 showing the campus. As will be understood, other information relating to an identification of the academic instruction may be displayed. Based on the user's preferences with respect to information about engineering programs, information 34 relating to the engineering program associated with the academic institution is displayed.

Figure 6:
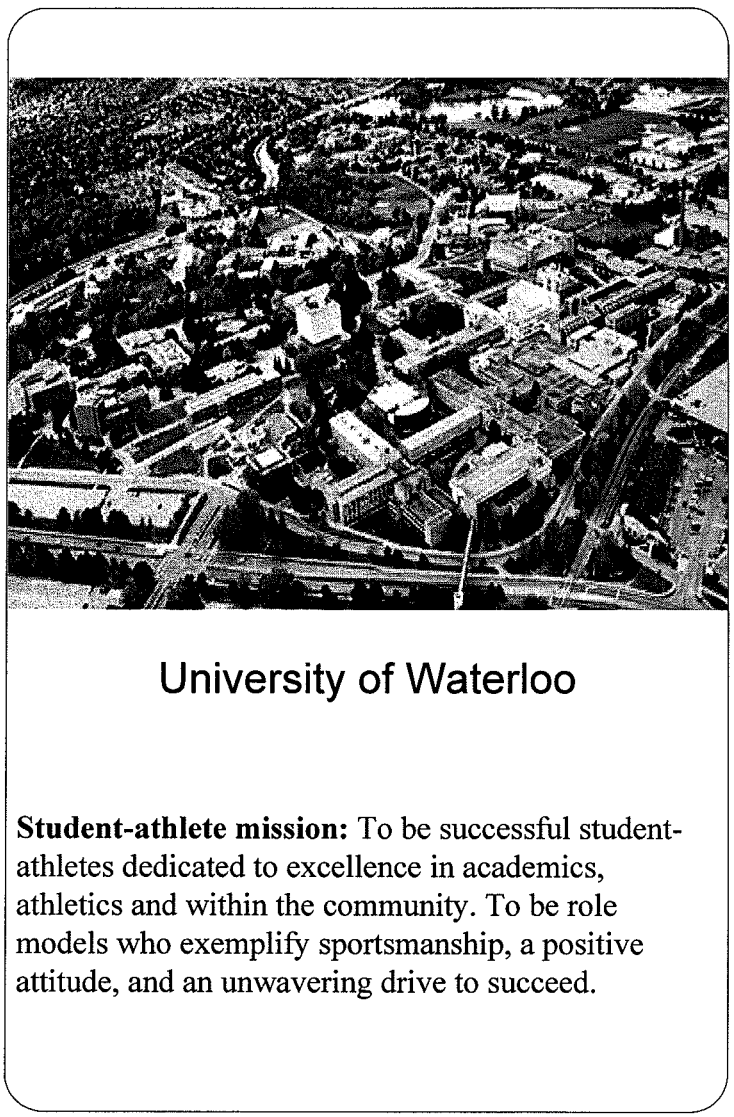
FIG. 6 is a further example of a mobile communication device displaying a branded application according to an exemplary embodiment of the present disclosure.

Turning to FIG. 6, another example of a mobile communication device displaying a branded application according to an exemplary embodiment of the present disclosure is shown. In this figure, it is assumed that the user defined preferences/rules with respect to the branded application require that information relating to the athletics program with respect to the academic institution be displayed.

As shown in FIG. 6, the mobile communication device 12 includes a display 20 for displaying the branded application to the user. The information which is displayed to the user may include an indication or identification 30 of the academic institution (University of Waterloo) along with a picture 32 showing the campus. As will be understood, other information relating to an identification of the academic instruction may be displayed. Based on the user's preferences with respect to information about athletic program, information 34 relating to the athletic program associated with the academic institution is displayed.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a non-transitory medium (also referred to as a non-transitory computer-readable medium, a non-transitory processor-readable medium, or a non-transitory computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The non-transitory machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the non-transitory machine-readable medium. The instructions stored on the non-transitory machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A method of displaying, within a customized application, user content for a site of interest to a user associated with a mobile communication device comprising:
   determining location of the mobile communication device;
   creating list of sites of interest in proximity to the mobile communication device;
   obtaining travel characteristics of the mobile communication device;
   selecting, at a server, a site of interest from the list of sites of interest based on travel characteristics and location of the mobile communication device, the server selected from a plurality of servers based at least in part on the location and the travel characteristics of the mobile device;
   checking user defined preferences for display of user content for the customized application, wherein the user content received is configurable based at least in part on the user defined preferences for the user content; and
   displaying customized application within user content associated with the selected site of interest.

2. The method of claim 1 wherein determining location of the mobile communication device comprises:
   accessing location software on the mobile communication device.

3. The method of claim 2 wherein the location software is a global positioning system (GPS).

4. The method of claim 1 wherein creating list of sites of interest comprises:
   comparing location of mobile communication device with sites of interest stored in a database; and
   selecting sites of interest in the database which are within a specified distance from the location of the mobile communication device to create a list of sites of interest.

5. The method of claim 4 wherein comparing location comprises:
   comparing location of mobile communication device with location data corresponding to the list of places of interest.

6. The method of claim 1 wherein obtaining travel characteristics comprises retrieving direction of travel of the mobile communication device and speed of travel of the mobile communication device.

7. The method of claim 1 wherein the method is performed within a learning management system.

8. A method of personalizing an application for displaying, on a mobile communication device, user content associated with a site, the method comprising:
   determining a location of the mobile communication device;
   calculating travel characteristics of the mobile communication device;
   determining presence of a site, based at least in part on the location and travel characteristics of the user device;
   obtaining user preferences for display of user content, wherein the user content received is configurable based at least in part on the user defined preferences for the user content; and
   retrieving, from a server, and displaying user content associated with the site on the mobile communication device, wherein the server is selected from a plurality of servers based at least in part on the location and the travel characteristics of the mobile device.

9. The method of claim 8 wherein determining location of the mobile communication device comprises accessing location software on the mobile communication device.

10. The method of claim 9 wherein the location software is global positioning system (GPS).

11. The method of claim 8 wherein calculating travel characteristics comprises at least one of determining direction of travel of the mobile communication device or determining speed of travel of the mobile communication device.

12. The method of claim 8 wherein determining presence of a site comprises:
    determining list of sites proximate the location of the mobile communication device; and
    creating a list of sites of interest from the list of sites based on travel characteristics of the mobile communication device.

13. The method of claim 12 further comprising:
    displaying the list of sites of interest for selection by a user; and
    receiving user's selection of site.

14. The method of claim 12 further comprising:
    choosing a site from the list of sites of interest based on user criteria.

15. The method of claim 8 wherein obtaining user preferences for display of user content comprises:
    accessing a database storing displaying requirements associated with a user of the mobile communication device.

16. The method of claim 8 wherein the method is performed within a learning management system.

17. The method of claim 8, wherein the application is a customized application.

18. The method of claim 17, further comprising:
    selecting a site of interest from a list of sites of interest based on travel characteristics and location of the mobile communication device,
    wherein the determining of the presence of the site comprises generating a list of sites of interests.

19. The method of claim 18, wherein the retrieving and displaying user content associated with the site on the mobile communication device comprises:
    checking user defined preferences for display of user content for the customized application; and displaying the customized application within user content associated with selected site of interest.

20. A non-transitory computer readable storage medium storing computer executable instructions thereon that when executed by a computer perform the method steps of claim 8.

* * * * *